United States Patent
Gong et al.

(10) Patent No.: US 12,338,784 B2
(45) Date of Patent: Jun. 24, 2025

(54) DEVICE AND METHOD FOR STARTING PUMPED STORAGE GROUP AND PUMPED STORAGE SYSTEM

(71) Applicant: CSG POWER GENERATION CO., LTD. MAINT. AND TEST CO., Guangzhou (CN)

(72) Inventors: Yu Gong, Guangzhou (CN); Mingxuan Yang, Guangzhou (CN); Yaxiong Yu, Guangzhou (CN); Tao Chen, Guangzhou (CN); Jialiang Yu, Guangzhou (CN); Qing Li, Guangzhou (CN); Xiaobo Qiu, Guangzhou (CN); Yequan Liang, Guangzhou (CN)

(73) Assignee: CSG POWER GENERATION CO., LTD. MAINT. AND TEST CO., Guangzhou (CN)

( * ) Notice: Subject to any disclaimer, the term of this patent is extended or adjusted under 35 U.S.C. 154(b) by 0 days.

(21) Appl. No.: 18/705,723

(22) PCT Filed: Oct. 31, 2023

(86) PCT No.: PCT/CN2023/128587
§ 371 (c)(1),
(2) Date: Apr. 29, 2024

(87) PCT Pub. No.: WO2024/239545
PCT Pub. Date: Nov. 28, 2024

(65) Prior Publication Data
US 2025/0109732 A1    Apr. 3, 2025

(30) Foreign Application Priority Data
May 22, 2023    (CN) .......................... 202310576028.9

(51) Int. Cl.
*F03B 15/00*    (2006.01)
*F03B 13/06*    (2006.01)

(52) U.S. Cl.
CPC ............ *F03B 15/005* (2013.01); *F03B 13/06* (2013.01)

(58) Field of Classification Search
CPC ............................... F03B 15/005; F03B 13/06
See application file for complete search history.

(56) References Cited

U.S. PATENT DOCUMENTS

| 10,031,535 B2 * | 7/2018 | Rollins | .................. F04D 27/002 |
| 11,761,859 B2 * | 9/2023 | Zhang | ................... G01M 99/00 |
| | | | 702/189 |

(Continued)

FOREIGN PATENT DOCUMENTS

| CN | 103925156 A | 7/2014 |
| CN | 110454322 A | 11/2019 |

(Continued)

OTHER PUBLICATIONS

International Search Report for corresponding PCT Application No. PCT/CN2023/128587, dated Feb. 7, 2024, 3 pages.

(Continued)

*Primary Examiner* — Pedro J Cuevas
(74) *Attorney, Agent, or Firm* — Taft Stettinius & Hollister LLP

(57) ABSTRACT

A device and method for starting a pumped storage group, and a pumped storage system are disclosed. The device includes: an acquisition module configured to acquire starting data of the group in real time; a first determination module configured to determine a real-time speed versus time curve for the group based on the starting data; and a correction module configured to correct a starting speed of the group based on a deviation between a reference speed (Continued)

versus time curve cluster and the real-time speed versus time curve. The real-time speed of the group during starting is visualized through a curve fitting procedure to form the real-time speed versus time curve, the real-time speed versus time curve is compared with a favorable history operation curve, and the deviation between the real-time speed versus time curve and the favorable history operation curve is corrected to adjust the starting speed of the group.

8 Claims, 10 Drawing Sheets

(56) References Cited

U.S. PATENT DOCUMENTS

2022/0326122 A1* 10/2022 Zhang ................ G06Q 10/063
2024/0117791 A1* 4/2024 Holtom ................ F03D 17/011

FOREIGN PATENT DOCUMENTS

| CN | 111271220 A | | 6/2020 | |
|---|---|---|---|---|
| CN | 116292060 A | | 6/2023 | |
| FR | 2841302 A1 | | 12/2003 | |
| GB | 897907 A | * | 5/1962 | .............. F03B 13/06 |
| GB | 1051887 A | * | 12/1966 | .............. F03B 13/06 |
| GB | 2057585 B | * | 4/1983 | ............ F03B 15/005 |
| JP | H1037842 A | | 2/1998 | |

OTHER PUBLICATIONS

Written Opinion for corresponding PCT Application No. PCT/CN2023/128587, dated Feb. 7, 2024, 3 pages.
Chinese Office Action for corresponding CN Application No. 202310576028.9, dated Jun. 27, 2023, 6 pages.

* cited by examiner

DEVICE AND METHOD FOR STARTING PUMPED STORAGE GROUP AND PUMPED STORAGE SYSTEM

CROSS-REFERENCE TO RELATED APPLICATIONS

This application is a US National Stage application under 35 U.S.C. § 371 of PCT International Application No. PCT/CN2023/128587, which has an international filing date of Oct. 31, 2023 and claims priority to Chinese patent application no. 2023105760289. The entireties of both applications are incorporated by reference herein for all purposes.

TECHNICAL FIELD

The present disclosure relates to the field of pumped storage technology, and more particularly, to a device and method for starting a pumped storage group and a pumped storage system.

BACKGROUND

Pumped storage power station is a large energy storage equipment, which can adjust power systems of different kinds of energy generation. It can work as water pump and water turbine respectively. It has the dual properties of power plant and user. The group starts frequently and the starting current is large. At present, the starting modes of pumped storage groups include coaxial small motor starting, asynchronous starting, synchronous starting, semi-synchronous starting and variable frequency starting. A static variable frequency starting device (StaticFrequency Converter, SFC) is generally used in pumped storage power stations in China.

The conventional starting method for the pumped storage group will have large fluctuations in the speed when carrying different loads each time, and have a large deviation from the optimal operating state, which will lead to the unstable operating state of the group each time of starting. Accordingly, it is prone to failure, and there is a very large short-circuit current in case of short-circuit failure, resulting in equipment damage and economic loss.

SUMMARY

The present disclosure provides a device and method for starting a pumped storage group and a pumped storage system, which can effectively improve stability and safety of the group during starting and reduce the economic loss.

According to an aspect of the present disclosure, there is provided a device for starting a pumped storage group. The device includes an acquisition module, a first determination module and a correction module.

The acquisition module is configured to acquire starting data of the group in real time. The first determination module is coupled to the acquisition module, and the first determination module is configured to determine the real-time speed versus time curve for the group based on the starting data. The correction module is coupled to the first determination module, and the correction module is configured to correct the starting speed of the group based on a deviation between a reference speed versus time curve cluster and the real-time speed versus time curve.

Optionally, the device for starting the pumped storage group further includes a second determination module and a storage module.

The second determination module is configured to determine reference speed versus time curves for the group corresponding to different loads as the reference speed versus time curve cluster based on historical operating condition data.

The storage module is coupled to the second determination module, and the storage module is configured to store the reference speed versus time curve cluster.

Optionally, the correction module includes a first sub-module and a second sub-module.

The first sub-module is coupled to the first determination module, and the first sub-module is configured to determine a present reference speed versus time curve of the reference speed versus time curve cluster based on a load corresponding to the real-time speed versus time curve. The present reference speed versus time curve and the real-time speed versus time curve are the same in load.

The second sub-module is coupled to the first sub-module, and the second sub-module is configured to correct the starting speed of the group based on a deviation between the real-time speed versus time curve and the present reference speed versus time curve when a load of the group at a next starting is the same as a load of the group at present.

Optionally, the second sub-module includes a speed offset interval determination unit and a first correction unit.

The speed offset interval determination unit is coupled to the first sub-module, and the speed offset interval determination unit is configured to determine a speed offset interval based on the real-time speed versus time curve and the present reference speed versus time curve.

The first correction unit is coupled to the speed offset interval determination unit, and the first correction unit is configured to correct the starting speed of the group based on an average speed offset rate of the speed offset interval.

Optionally, the speed offset interval determination unit includes a speed offset point determination sub-unit and a rotation first speed offset interval determination sub-unit.

The speed offset point determination sub-unit is coupled to the first sub-module, and the speed offset point determination sub-unit is configured to determine, based on a speed offset rate of the real-time speed versus time curve and the present reference speed versus time curve at a same time point and a preset offset rate, a speed offset point.

The speed offset point determination sub-unit is coupled to the first speed offset interval determination sub-unit, and the first speed offset interval determination sub-unit is configured to determine the speed offset interval based on continuity of the speed offset point.

Optionally, the second sub-module further comprises an interval speed offset point determination unit and an average speed offset rate determination unit.

The interval speed offset point determination unit is coupled to the speed offset interval determination unit, and the interval speed offset point determination unit is configured to determine an interval speed offset point based on the speed offset interval.

The interval speed offset point determination unit is coupled to the average speed offset rate determination unit, and the average speed offset rate determination unit is configured to determine the average speed offset rate of the speed offset interval based on the speed offset rate of the interval speed offset point.

Optionally, the device for starting the pumped storage group further includes a group starting load determination module.

The group starting load determination module is configured to determine a load of the group at the next starting. The group starting load determination module is coupled to the acquisition module, and the group starting load determination module is further configured to control the acquisition module to operate if the load of the group at the next starting is different from the load of the group at a present starting.

According to another aspect of the present disclosure, there is provided a method for starting a pumped storage group. The method includes:

first step: acquiring starting data of the group in real time;
second step: determining a real-time speed versus time curve for the group based on the starting data; and
third step: correcting a starting speed of the group based on a deviation between a reference speed versus time curve cluster and the real-time speed versus time curve.

Optionally, correcting the starting speed of the group based on a deviation between a reference speed versus time curve cluster and the real-time speed versus time curve includes:

determining a present reference speed versus time curve of the reference speed versus time curve cluster based on a load corresponding to the real-time speed versus time curve, the present reference speed versus time curve and the real-time speed versus time curve being the same in load; and correcting the starting speed of the group based on the deviation between the real-time speed versus time curve and the present reference speed versus time curve when a load of the group at a next starting is the same as a load of the group at present.

According to a further aspect of the present disclosure, there is provided a pumped storage system including the device for starting the pumped storage group according to any embodiment of the present disclosure, and the pumped storage group.

The device for starting the pumped storage group is coupled to the pumped storage group, and the device for starting the pumped storage group is configured to control the starting of the pumped storage group.

In the technical solution provided by embodiments of the present disclosure, the acquisition module, the first determination module and the correction module are disclosed. The acquisition module is configured to acquire the starting data of the group in real time, the first determination module is configured to determine the real-time speed versus time curve for the group based on the starting data, and the correction module is configured to correct the starting speed of the group based on the deviation between the reference speed versus time curve cluster and the real-time speed versus time curve. In the embodiments of the present disclosure, the real-time speed of the group during starting is fitted to form the real-time speed versus time curve, the real-time speed versus time curve is compared with a favorable history operation curve, and the deviation between the real-time speed versus time curve and the favorable history operation curve is corrected to adjust the starting speed of the group. As a result, the starting state of the group is more stable, the stability and safety of the group during starting are effectively improved, and the economic loss is reduced.

It should be understood that the content described in this section is not intended to identify key or important features of the embodiments of the present disclosure, nor is it intended to limit the scope of the present disclosure. Other features of the present disclosure will be readily understood by the following description.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still obtain other drawings from these accompanying drawings without creative efforts.

DETAILED DESCRIPTION

In order to make technical solutions proposed in the present disclosure better understood by persons of ordinary skill in the art, the technical solutions in the embodiments of the present disclosure will be clearly and completely described below with reference to the accompanying drawings in the embodiments of the present disclosure. It is clear that the described embodiments are only some but not all of the embodiments of the present disclosure. Based on the embodiments of the present disclosure, all other embodiments obtained by persons of ordinary skill in the art without creative efforts shall fall within the scope of protection of the present disclosure.

It should be noted that in the specification, claims, and accompanying drawings of the present disclosure, the terms "first", "second" and the so on are intended to distinguish between different objects but do not indicate a particular order. It should be understood that the numbers used as such may be interchanged where appropriate so that the embodiments of the present disclosure described herein can be implemented in an order other than those illustrated or described herein. In addition, the terms "include", "have" and any variations thereof are intended to cover non-exclusive inclusions. For example, a process, a method, a system, a product, or a device that includes a series of steps or units is not limited to the listed steps or units, but optionally further includes an unlisted step or unit, or optionally further includes another inherent step or unit of the process, the method, the product, or the device.

First Embodiment

Figure 1:
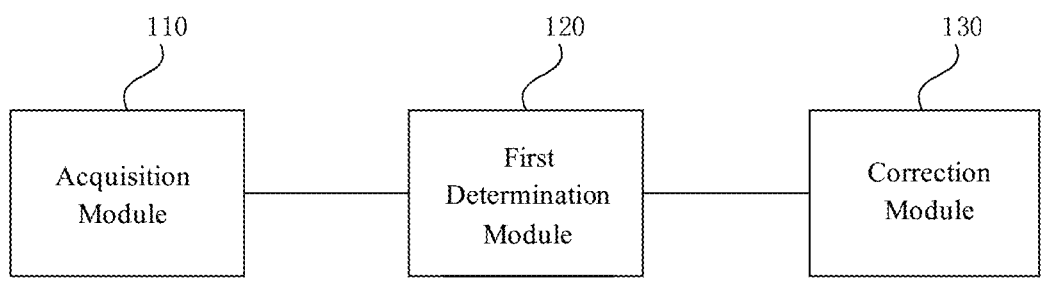
FIG. 1 is a schematic diagram illustrating a configuration of a device for starting a pumped storage group according to a first embodiment of the present disclosure.

FIG. 1 is a schematic diagram illustrating a device for starting a pumped storage group according to a first embodiment of the present disclosure. As shown in FIG. 1, the device includes an acquisition module 110, a first determination module 120, and a correction module 130.

The acquisition module 110 is configured to acquire starting data of the group in real time. The first determination module 120 is coupled to the acquisition module 110, and the first determination module 120 is configured to determine a real-time speed versus time curve for the group based on the starting data. The correction module 130 is coupled to the first determination module 120, and the correction module 130 is configured to correct a starting speed of the group based on a deviation between a reference speed versus time curve cluster and the real-time speed versus time curve.

The starting data of the group is acquired so as to subsequently determine the real-time speed versus time curve for the group from the starting data. The real-time speed versus time curve for the group is determined so as to be compared with the reference speed versus time curve cluster subsequently, to obtain the deviation and correct the deviation. The speed versus time curve cluster can be specifically understood as follows. Speed characteristics at the time of starting a same pumped storage group are different when the pumped storage group is carried with different loads. Based on previous operating conditions of a certain pumped storage group, the speed characteristics having better starting conditions under different loads are selected to fit a plurality of group operation curves under the different loads. The plurality of group operation curves is referred to as the speed versus time curve cluster. By way of example, in the embodiment of the present disclosure, a speed measurer is used as an example to measure the speed of the group for a period of time from a start-up to a steady-state operation, and the starting data of the group is acquired.

Figure 2:
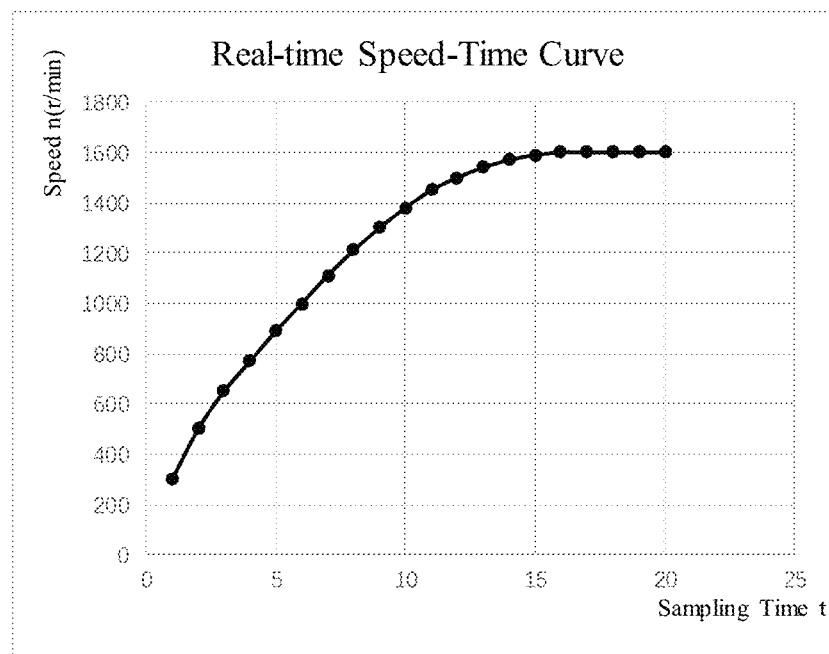
FIG. 2 is a schematic diagram illustrating a real-time speed versus time curve according to the first embodiment of the present disclosure.
Figure 3:
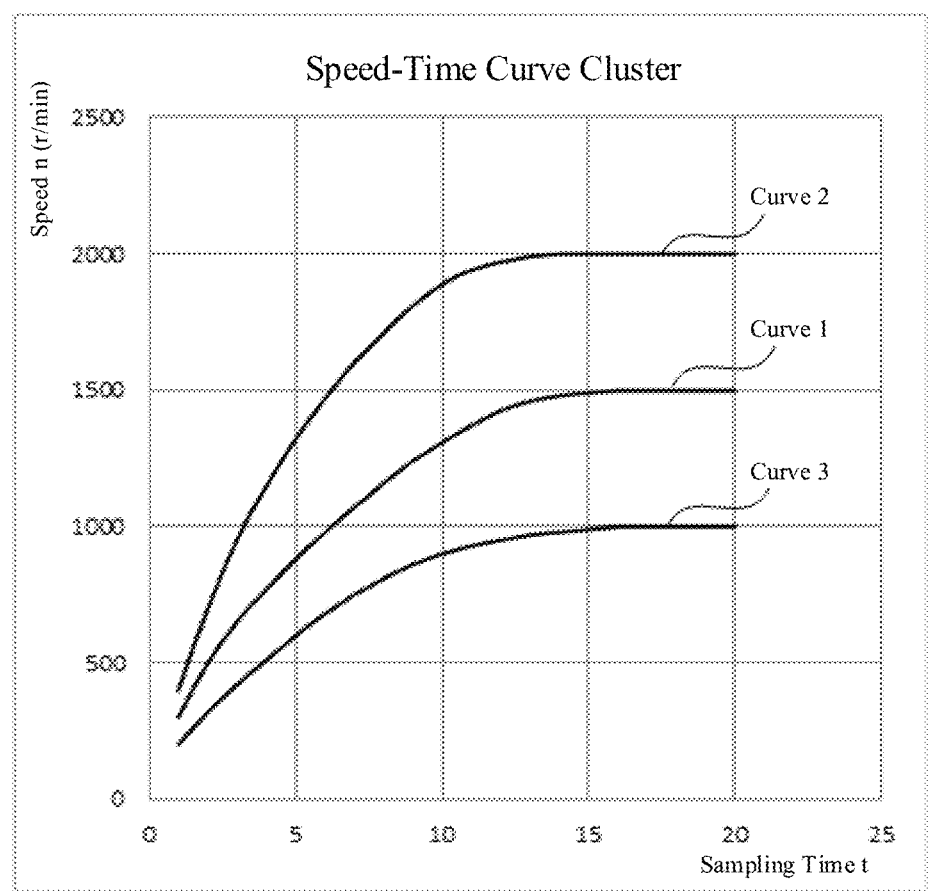
FIG. 3 is a schematic diagram illustrating a speed versus time curve cluster according to the first embodiment of the present disclosure.
Figure 4:
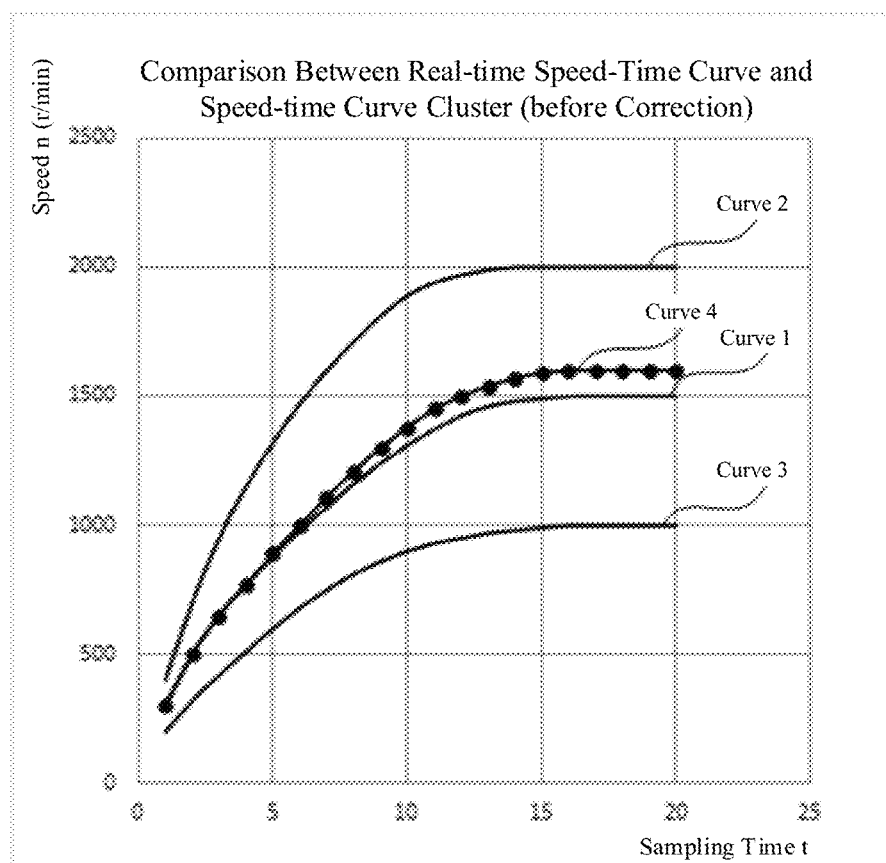
FIG. 4 is a schematic diagram illustrating a comparison between a real-time speed versus time curve and a speed versus time curve cluster before correction according to the first embodiment of the present disclosure.
Figure 5:
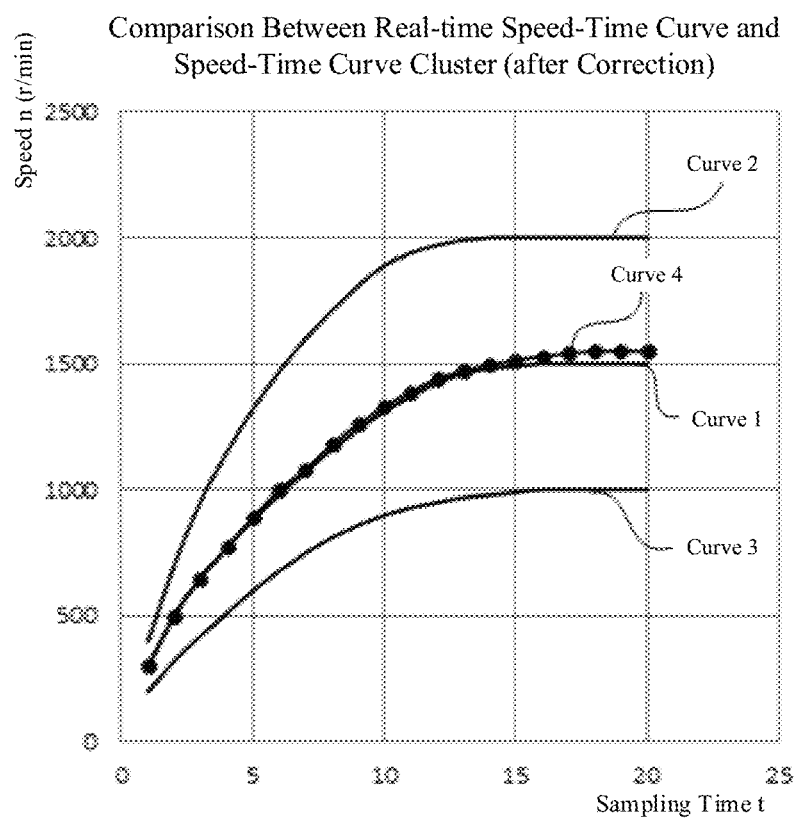
FIG. 5 is a schematic diagram illustrating a comparison between the real-time speed versus time curve and the speed versus time curve cluster after correction according to the first embodiment of the present disclosure.

Specifically, according to the characteristic that the pumped storage group can measure the speed of the group, the speed of the group from the start-up to the steady-state operation is measured at equal time intervals, and the starting data of the group is acquired in real time. According to the characteristic that the pumped storage group that can measure the speed of the group in real time, the speed of the group from the start-up to the steady-state operation is measured in real time, and then measured speeds are fitted in real time to generate the real-time speed versus time curve for the group. FIG. 2 is a schematic diagram illustrating the real-time speed versus time curve provided in the first embodiment of the present disclosure. As shown in FIG. 2, different sampling times t correspond to different speed n (r/min). For convenience of description, only twenty samples are shown in the figure. FIG. 3 is a schematic diagram illustrating a speed versus time curve cluster provided in the first embodiment of the present disclosure. Three operation curves for the group which have a favorable operation under three different loads are shown in FIG. 3. The real-time speed versus time curve obtained in FIG. 2 is compared with the favorable operation curve for the group carried with the same load in the speed versus time curve cluster obtained in FIG. 3. FIG. 4 is schematic diagram illustrating a comparison between the real-time speed versus time curve and the speed versus time curve cluster before correction according to the first embodiment of the present disclosure. In FIG. 4, the curve 4 is the real-time speed versus time curve for the group, and the load corresponding to the curve 1 in the speed versus time curve cluster is the same as the load of the group at this time. In this case, the curve 1 is compared with the curve 4. A speed offset rate is calculated based on the sampling time t and the real-time speed n (r/min). A speed offset point is positioned based on the speed offset rate. A speed offset interval is determined based on the speed offset point. The starting speed of the group is corrected based on the speed offset interval. The corrected speed curve for the group is shown in FIG. 5, which is a schematic diagram illustrating a comparison between the real-time speed versus time curve and the speed versus time curve cluster after the correction according to the first embodiment of the present disclosure. It can be seen from FIG. 5 that, after the speed correction, the real-time speed versus time curve (curve 4) is more closely fitted to the favorable operation curve (curve 1) than before the correction, and the speed deviation rate at each sampling time in the whole starting process is significantly reduced compared with before the correction, which indicates that the speed characteristic during the starting of the group is significantly improved after the speed deviation correction.

The operation process of the device for starting the pumped storage group is as follows. The acquisition module 110 acquires the starting data of the group in real time, the first determination module 120 forms the real-time speed versus time curve for the group after fitting the starting data acquired by the acquisition module 110, and the correction module 130 corrects the starting speed of the group based on the deviation between the reference speed versus time curve cluster and the real-time speed versus time curve. As a result, the starting state of the group is more stable, and the stability and safety of the group during starting are effectively improved.

In the technical solution provided by embodiments of the present disclosure, the acquisition module, the first determination module and the correction module are disclosed. The acquisition module is configured to acquire the starting data of the group in real time, the first determination module is configured to determine the real-time speed versus time curve for the group based on the starting data, and the correction module is configured to correct the starting speed of the group based on the deviation between the reference speed versus time curve cluster and the real-time speed versus time curve. In the embodiments of the present disclosure, the real-time speed of the group during starting is fitted to form the real-time speed versus time curve, the real-time speed versus time curve is compared with a favorable history operation curve, and the deviation between the real-time speed versus time curve and the favorable history operation curve is corrected to adjust the starting speed of the group. As a result, the starting state of the group is more stable, the stability and safety of the group during starting are effectively improved, and the economic loss is reduced.

Second Embodiment

Figure 6:
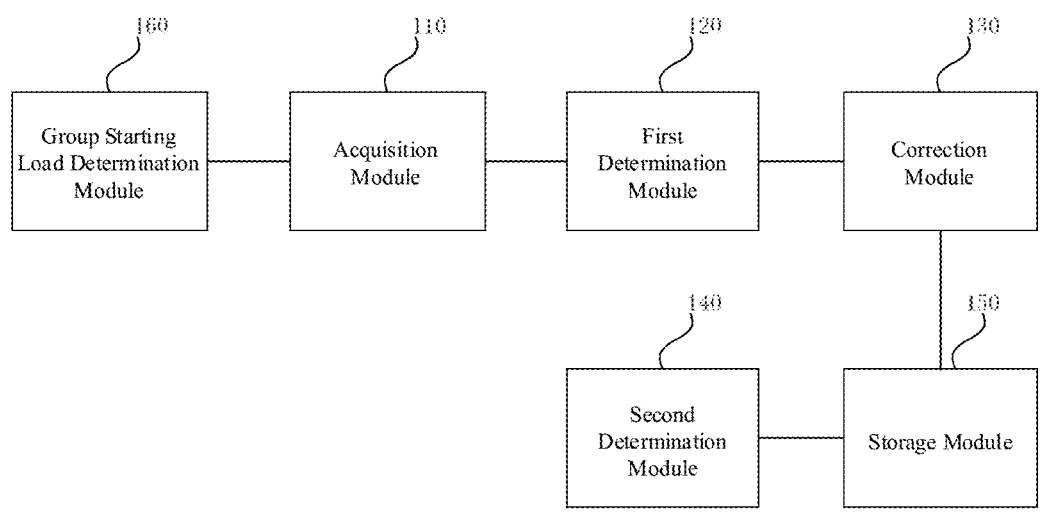
FIG. 6 is a schematic diagram illustrating a configuration of a device for starting a pumped storage group according to a second embodiment of the present disclosure.

FIG. 6 is a schematic diagram illustrating a configuration of a device for starting a pumped storage group according to a second embodiment of the present disclosure. This embodiment further details the foregoing embodiment on the basis of the foregoing embodiment. As shown in FIG. 6, optionally, the device for starting the pumped storage group further includes a second determination module 140 and a storage module 150.

The second determination module 140 is configured to determine, based on historical operating condition data, reference speed versus time curves for the group corresponding to different loads as the reference speed versus time curve cluster;

The storage module 150 is coupled to the second determination module 140, and the storage module 150 is configured to store the reference speed versus time curve cluster.

The reference speed versus time curves for the group corresponding to different loads are determined as the reference speed versus time curve cluster, so as to correct the starting speed of the group based on the deviation between a reference speed versus time curve cluster and the real-time speed versus time curve.

Figure 7:
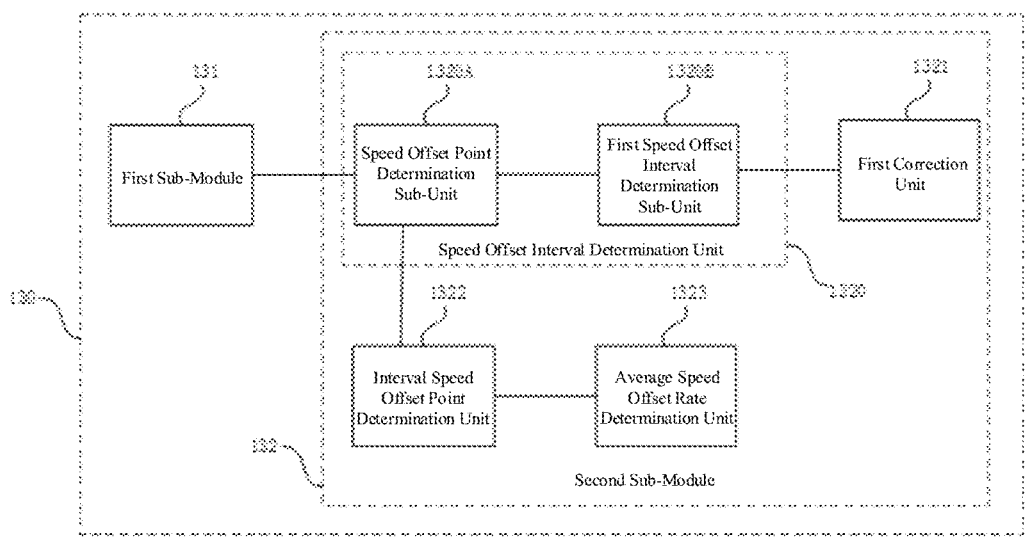
FIG. 7 is a schematic diagram illustrating a configuration of correction module of the device for starting the pumped storage group according to the second embodiment of the present disclosure.

FIG. 7 is a schematic diagram illustrating a configuration of correction module of the device for starting the pumped storage group according to the second embodiment of the present disclosure. As shown in FIG. 7, optionally, the correction module 130 includes a first sub-module 131 and a second sub-module 132.

The first sub-module 131 is coupled to the first determination module 120, and the first sub-module 131 is configured to determine a present reference speed versus time curve of the reference speed versus time curve cluster based on a load corresponding to the real-time speed versus time curve. The present reference speed versus time curve and the real-time speed versus time curve are the same in load.

The second sub-module 132 is coupled to the first sub-module 131, and the second sub-module 132 is configured to correct the starting speed of the group based on the deviation between the real-time speed versus time curve and the present reference speed versus time curve when a load of the group at a next starting is the same as a load of the group at present.

Specifically, the load applied on the group at next starting is the same as the load applied on the group at the last starting, that is, when the load of the group at the next starting is the same as the load of the group at present, an average speed offset rate is used as an input parameter of a speed feedback adjuster. When the group is carried with the same load at the next starting, the speed deviation will be corrected or the speed deviation rate will be reduced to an acceptable range. The corrected speed curve for the group refers to FIG. 5. It can be seen from FIG. 5 that, after the correction by the speed feedback adjuster, the real-time speed versus time curve (curve 4) is more closely fitted to the favorable operation curve (curve 1) than before the correction, and the speed deviation rate at each sampling time in the whole start process is significantly reduced compared with before the correction, which indicates that the speed characteristic at the time of the group start is significantly improved after the correction of the speed deviation.

With continued reference to FIG. 7, optionally, the second sub-module 132 includes a speed offset interval determination unit 1320 and a first correction unit 1321.

The speed offset interval determination unit 1320 is coupled to the first sub-module 131, and the speed offset interval determination unit 1320 is configured to determine the speed offset interval based on the real-time speed versus time curve and the present reference speed versus time curve.

The first correction unit 1321 is coupled to the speed offset interval determination unit 1320, and the first correction unit 1321 is configured to correct the starting speed of the group based on the average speed offset rate of the speed offset interval.

An interval in which three or more speed offset points occur continuously is the speed offset interval. Specifically, the speed offset interval determination unit 1320 determines the speed offset interval by finding, based on the real-time speed versus time curve and the present reference speed versus time curve, the interval in which three or more speed offset points continuously occur within the sampling period. The first correction unit 1321 corrects the starting speed of the group based on the average speed offset rate of the speed offset interval.

With continued reference to FIG. 7, optionally, the speed offset interval determination unit 1320 includes a speed offset point determination sub-unit 1320A and a first speed offset interval determination sub-unit 1320B.

The speed offset point determination sub-unit 1320A is coupled to the first sub-module 131, and the speed offset point determination sub-unit 1320A is configured to determine the speed offset point based on the speed offset rate of the real-time speed versus time curve and the present reference speed versus time curve at a same time point and the preset offset rate.

The speed offset point determination sub-unit 1320A is coupled to the first speed offset interval determination sub-unit 1320B, and the first speed offset interval determination sub-unit 1320B is configured to determine the speed offset interval based on the continuity of the speed offset point.

The speed offset rate can be specifically understood as a percentage of the speed offset between the speed of the real-time speed time curve and the speed of the favorable operation curve at the same sampling time. In order to avoid the influence of occasional data, it is specified that the speed point in which the absolute value of the speed offset rate is above 5% in the real-time speed versus time curve and the favorable operation curve at the same sampling time is referred to as the speed offset point.

In the embodiment of the present disclosure, the speed offset interval is determined, the interval data with the speed deviation is processed as an input parameter of the speed feedback adjuster, and then the speed deviation is corrected. In the present disclosure, the speed deviation generated in the starting process can be corrected. As a result, the stability of the group operation can be improved, the probability of the group failure can be reduced, and the maintenance cost and the economic loss caused by the group damage can be saved.

Optionally, the second sub-module 132 further includes an interval speed offset point determination unit 1322 and an average speed offset rate determination unit 1323.

The interval speed offset point determination unit 1322 is coupled to the speed offset interval determination unit 1320, and the interval speed offset point determination unit 1322 is configured to determine the interval speed offset point based on the speed offset interval;

The interval speed offset point determination unit 1322 is coupled to the average speed offset rate determination unit 1323, and the average speed offset rate determination unit 1323 is configured to determine the average speed offset rate of the speed offset interval based on the speed offset rate of the interval speed offset point.

The average speed offset rate may be specifically understood as an average of speed offset rates of all speed offset points within the speed offset interval. The average speed offset rate of the speed offset interval is determined based on the speed offset rate of the interval speed offset point, and its function is to determine the speed offset interval based on the average speed offset rate, and further realize the correction of the starting speed of the group.

For example, referring to FIG. 4, when the sampling time t is 10 s, the real-time speed n4 is 1380 r/min, the corresponding speed n1 in the curve 1 is 1310 r/min, and the speed offset rate is:

$$W_{10} = \frac{n_4 - n_1}{n_1} \times 100\% = 5.41\%.$$

Based on the above formula, it can be derived that when t=10 s, the absolute value of the speed offset rate is $|W_{10}|$=5.41%>5%. The sampling time of the real-time speed versus time curve, i.e., t=10 s, is referred to as the speed offset point. Since the absolute values of the speed offset rates of the real-time speed curve in the period from the sampling time t=10 s to the sampling time t=20 s are all greater than five percent, the sampling points in the period are all the speed offset points, and there are more than three continuous speed offset points, the interval from the sampling time t=10 s to the sampling time t=20 s is referred to as the speed offset interval, which is denoted as $[t_{10}, t_{20}]$. The speed offset points in the real-time speed versus time curve within the speed offset interval $[t_{10}, t_{20}]$ are all the continuous. The average of the speed deviation rates of all speed deviation points within the speed deviation intervals $[t_n, t_m]$ is referred to as the average speed deviation rate of this interval, that is:

$$\overline{W} = \frac{W_n + \ldots + W_m}{m - n + 1}.$$

With continued reference to FIG. 4, the speed deviation interval is $[t_{10}, t_{20}]$, and the points in the real-time speed versus time curve within this speed deviation interval are all continuous speed deviation points, and the average speed deviation rate of the interval $[t_{10}, t_{20}]$ is $$\overline{W} = \frac{W_{10} + W_{11} + W_{12} + \ldots + W_{19} + W_{20}}{11} = 6.19\%.$$

The starting speed of the group is corrected based on the average speed offset rate.

Referring to FIG. 6, optionally, the device for starting the pumped storage group further includes a group starting load determination module 160.

The group starting load determination module 160 is configured to determine a load of the group at a next starting. The group starting load determination module 160 is coupled to the acquisition module 110, and the group starting load determination module 160 is further configured to control the acquisition module 110 to operate if the load of the group at the next starting is different from the load of the group at a present starting.

Specifically, the load applied on the group at next starting is different from the load applied on the group at the last starting, that is, when the load of the group at the next starting is different from the load of the group at present, the average speed deviation rate obtained from the last starting cannot be used as the input parameter of the speed feedback adjuster for correction. The real-time speed versus time curve is regenerated, and compared with the speed versus time curve cluster, to calculate the speed deviation rate. The speed deviation point is positioned based on the speed deviation rate, the speed deviation interval is determined based on the speed deviation point, and the starting speed of the group is corrected based on the speed deviation interval.

In the technical solution provided by the embodiments of the present disclosure, according to the characteristic that the speed measurer can measure the speed of the pumped storage group in real time, the speed of the group is visualized after being processed through a curve fitting procedure. The speed deviation can be clearly seen from the curve graph after comparing the real-time speed versus time curve with the historical favorable operation curve, and the interval data with the speed deviation is processed as the input parameter of the speed feedback adjuster, and then the speed deviation is corrected, thereby effectively improving the stability and safety of the group operation, effectively improving the stability and safety of the group operation. After the speed deviation is corrected, the probability of the group failure is reduced, the maintenance cost is saved, and the economic loss is reduced.

Third Embodiment

Figure 8:
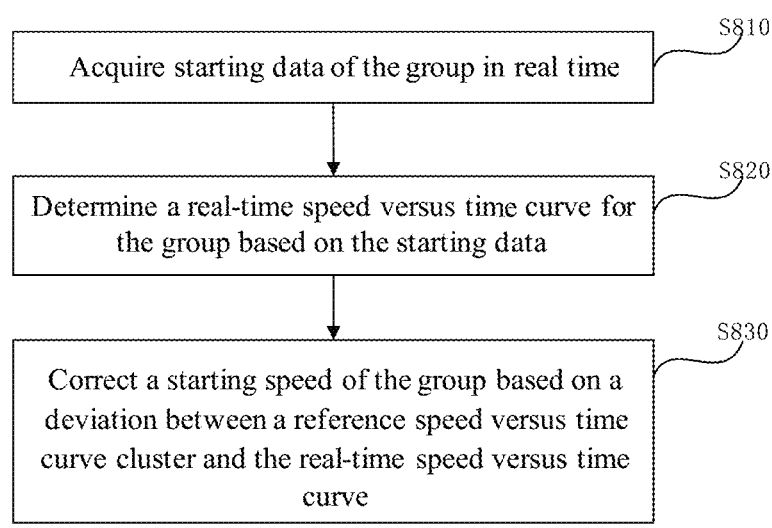
FIG. 8 is a flow diagram illustrating a method for starting a pumped storage group according to a third embodiment of the present disclosure.

FIG. 8 is a flow diagram illustrating a method for starting a pumped storage group according to a third embodiment of the present disclosure. The method for starting the pumped storage group can be executed by the device for starting the pumped storage group according to any embodiment of the present disclosure. The device for starting the pumped storage group starting includes an acquisition module, a first determination module and a correction module. As shown in FIG. 8, the method includes the following steps.

At S810, i.e., first step, starting data of the group is acquired in real time.

At S820, i.e., second step, a real-time speed versus time curve for the group is determined based on the starting data.

At S830, i.e., third step, the starting speed of the group is corrected based on a deviation between a reference speed versus time curve cluster and the real-time speed versus time curve.

In the technical solution provided in the embodiment of the present disclosure, the starting data of the group is acquired in real time, the real-time speed versus time curve for the group is formed after fitting the starting data, the comparison is performed based on the reference speed versus time curve cluster and the real-time speed versus time curve, and the deviation between the speed versus time curve cluster and the real-time speed versus time curve is corrected, so that the starting speed of the group is adjusted, the starting state of the group is more stable, the stability and safety of the group during starting are effectively improved, and the economic loss is reduced.

Optionally, correcting the starting speed of the group based on the deviation between the reference speed versus time curve cluster and the real-time speed versus time curve including:

determining a present reference speed versus time curve of the reference speed versus time curve cluster based on a load corresponding to the real-time speed versus time curve, the present reference speed versus time curve and the real-time speed versus time curve being the same in load.

When a load of the group at a next starting is the same as a load of the group at present, the starting speed of the group is corrected based on the deviation between the real-time speed versus time curve and the present reference speed versus time curve.

Figure 9:
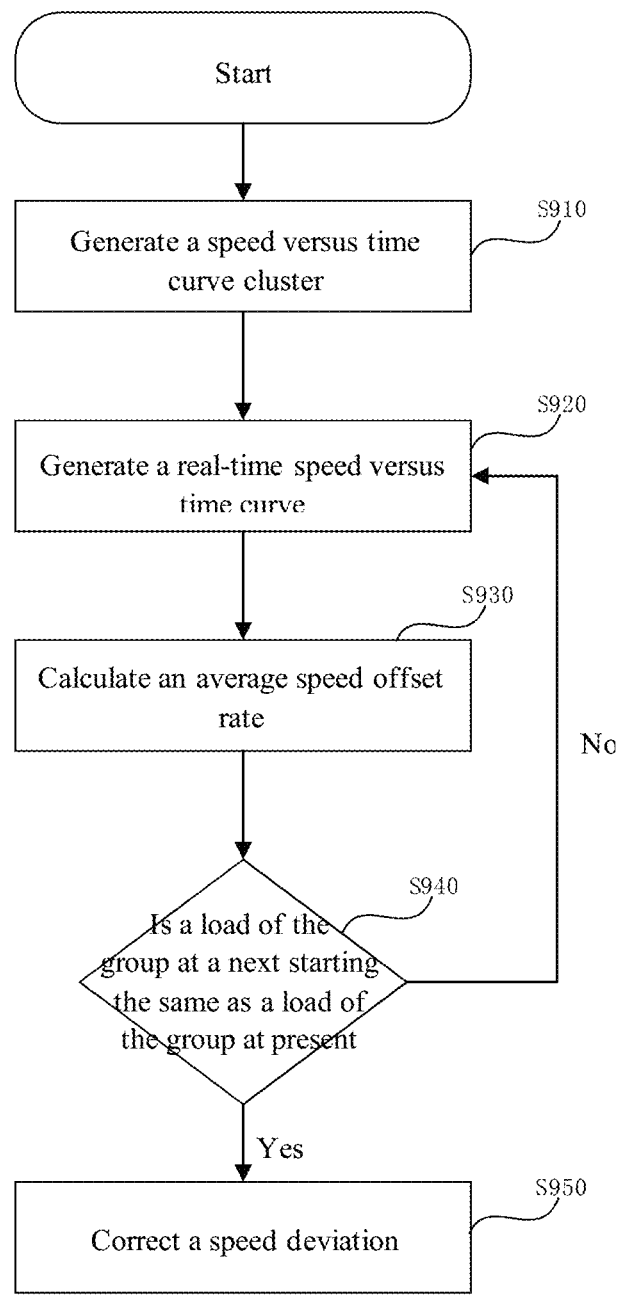
FIG. 9 is a flow diagram illustrating another method for starting a pumped storage group according to the third embodiment of the present disclosure.

FIG. 9 is a flow diagram illustrating another method for starting a pumped storage group according to the third embodiment of the present disclosure e. As shown in FIG. 9, the method includes the following steps.

At S910, a speed versus time curve cluster is generated.

At S920, a real-time speed versus time curve is generated.

At S930, an average speed deviation rate is calculated.

At S940, it is determined whether a load of the group at a next starting is the same as a load of the group at present.

If so, proceed to S950. If not, return to S920 and execute S920 and subsequent steps.

At S950, a speed deviation is corrected.

In the technical solution provided in the embodiment of the present disclosure, the starting data of the group is acquired in real time, the real-time speed versus time curve for the group is determined based on the starting data, and the starting speed of the group is corrected based on the deviation between the reference speed versus time curve cluster and the real-time speed versus time curve. By using the method of curve visualization after speed data fitting, the deviation degree between the real-time speed versus time curve and optimal operating speed curve can be seen from the comparison between the two curve charts, and the corrected effect can also be seen from the curve after data processing and speed deviation correction, so as to determine whether to adjust the input parameters of the group. As a result, the operation stability of the group can be improved, and the cost of maintenance of the group can be reduced.

Figure 10:
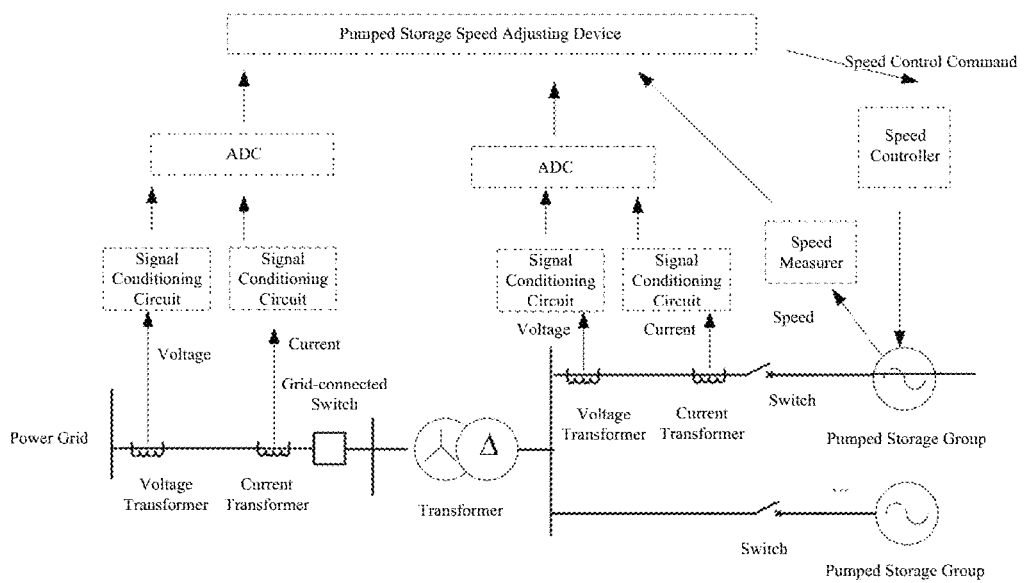
FIG. 10 is a schematic diagram illustrating a configuration of a pumped storage system according to the third embodiment of the present disclosure.

FIG. 10 is a schematic diagram illustrating a configuration of a pumped storage system according to the third embodiment of the present disclosure. The system includes the device for starting the pumped storage group according to any embodiment of the present disclosure, and the pumped storage group.

The device for starting the pumped storage group is coupled to the pumped storage group, and the device for starting the pumped storage group is configured to control the starting of the pumped storage group.

Specifically, referring to FIG. 10, a current transformer and a voltage transformer on two sides of a pumped storage grid-connected switch respectively acquire current and voltage on a power grid side and a water turbine side. The current and voltage of the analog quantity state acquired by the current transformer and the voltage transformer respectively are input into respective signal conditioning circuit to perform signal conditioning, to remove high-frequency noise. And then the analog-to-digital converter converts the analog quantity signal of the current and voltage into the digital quantity signal. The speed adjusting device acquires the digitally quantized current and voltage values, and acquires the speed of the pump turbine through the speed measurer. When the speed and the current and voltage on the pumped storage generator side are gradually increased, it indicates that the starting process of the pumped storage group is normal, and the speed adjusting device sends the speed control command to the speed controller. The speed of the group can be controlled based on the method for starting the pumped storage group provided by the embodiments of the present disclosure.

The pumped storage system provided in the embodiment of the present disclosure can execute the method for starting the pumped storage group provided in any embodiment of the present disclosure, and has the corresponding functional modules to execute the method, and has the same beneficial effects as the method.

It should be understood that steps can be reordered, added, or deleted using the various forms of flow shown above. For example, the steps described in the present disclosure may be performed in parallel, in sequence, or in a different order, as long as a desired result of the technical solution of the present disclosure can be achieved, which is not limited herein.

The specific embodiments are not intended to limit the scope of protection of the present disclosure. It will be appreciated by persons of ordinary skill in the art that various modifications, combinations, sub-combinations and substitutions may be made in accordance with design requirements and other factors. Any modifications, equivalent substitutions, improvements, etc. made within the spirit and principles of the present disclosure shall be included within the scope of the present disclosure.

The invention claimed is:

1. A device for starting a pumped storage group, comprising:
   an acquisition module configured to acquire starting data of the group in real time;
   a first determination module coupled to the acquisition module, and configured to determine a real-time speed versus time curve for the group based on the starting data; and
   a correction module coupled to the first determination module, and configured to correct a starting speed of the group based on a deviation between a reference speed versus time curve cluster and the real-time speed versus time curve;
   wherein the correction module includes a first sub-module and a second sub-module;
   wherein the first sub-module is coupled to the first determination module, and configured to determine a present reference speed versus time curve of the reference speed versus time curve cluster based on a load corresponding to the real-time speed versus time curve, and the present reference speed versus time curve and the real-time speed versus time curve are the same in load;
   the second sub-module is coupled to the first sub-module, and configured to correct the starting speed of the group based on the deviation between the real-time speed versus time curve and the present reference speed versus time curve, when a load of the group at a next starting is the same as a load of the group at present;
   the second sub-module includes a speed offset interval determination unit and a first correction unit;
   the speed offset interval determination unit is coupled to the first sub-module, and configured to determine a speed offset interval based on the real-time speed versus time curve and the present reference speed versus time curve; and
   the first correction unit is coupled to the speed offset interval determination unit, and configured to correct the starting speed of the group based on an average speed offset rate of the speed offset interval.

2. The device of claim 1, further comprising:
   a second determination module configured to determine, based on historical operating condition data, reference speed versus time curves for the group corresponding to different loads as the reference speed versus time curve cluster; and a storage module coupled to the second determination module, and configured to store the reference speed versus time curve cluster.

3. The device of claim 1, wherein the speed offset interval determination unit includes:
a speed offset point determination sub-unit coupled to the first sub-module, and configured to determine, based on a speed offset rate of the real-time speed versus time curve and the present reference speed versus time curve at a same time point and a preset offset rate, a speed offset point; and
a first speed offset interval determination sub-unit coupled to the speed offset point determination sub-unit, and configured to determine the speed offset interval based on continuity of the speed offset point.

4. The device of claim 1, wherein the second sub-module further includes:
an interval speed offset point determination unit coupled to the speed offset interval determination unit, and configured to determine an interval speed offset point based on the speed offset interval; and
an average speed offset rate determination unit coupled to the interval speed offset point determination unit, and configured to determine the average speed offset rate of the speed offset interval based on the speed offset rate of the interval speed offset point.

5. The device of claim 1, further comprising:
a group starting load determination module,
wherein the group starting load determination module is configured to determine a load of the group at the next starting, the group starting load determination module is coupled to the acquisition module, and the group starting load determination module is further configured to control the acquisition module to operate if the load of the group at the next starting is different from the load of the group at a present starting.

6. A method for starting a pumped storage group, executed by the device for starting the pumped storage group according to claim 1, the method comprising:
first step: acquiring starting data of the group in real time;
second step: determining a real-time speed versus time curve for the group based on the starting data; and
third step: correcting a starting speed of the group based on a deviation between a reference speed versus time curve cluster and the real-time speed versus time curve.

7. The method of claim 6, wherein correcting the starting speed of the group based on the deviation between the reference speed versus time curve cluster and the real-time speed versus time curve includes:
determining a present reference speed versus time curve of the reference speed versus time curve cluster based on a load corresponding to the real-time speed versus time curve, wherein the present reference speed versus time curve and the real-time speed versus time curve are the same in load; and
correcting the starting speed of the group based on the deviation between the real-time speed versus time curve and the present reference speed versus time curve, when a load of the group at a next starting is the same as a load of the group at present.

8. A pumped storage system comprising:
the device for starting the pumped storage group according to claim 1; and
the pumped storage group,
wherein the device for starting the pumped storage group is coupled to the pumped storage group, and the device for starting the pumped storage group is configured to control the starting of the pumped storage group.

* * * * *